（12） United States Patent
Rivers et al.

(10) Patent No.: US 6,373,607 B1
(45) Date of Patent: Apr. 16, 2002

(54) LIQUID CRYSTAL VARIABLE RETARDER FOR FREE-SPACE LASER COMMUNICATION SYSTEM

(75) Inventors: Michael D. Rivers, Santee; Richard G. Trissel, Cardiff, both of CA (US)

(73) Assignee: Trex Communications Corporation, San Diego, CA (US)

( * ) Notice: Subject to any disclaimer, the term of this patent is extended or adjusted under 35 U.S.C. 154(b) by 0 days.

(21) Appl. No.: 09/083,567

(22) Filed: May 22, 1998

(51) Int. Cl.[7] .............................................. H04B 10/10
(52) U.S. Cl. ........................ 359/156; 359/152; 359/172
(58) Field of Search ................................ 359/152, 172, 359/156, 122, 110

(56) References Cited

U.S. PATENT DOCUMENTS

| | | | | |
|---|---|---|---|---|
| 3,787,110 A | * | 1/1974 | Berreman et al. | 350/160 |
| 5,247,378 A | * | 9/1993 | Miller | 359/86 |
| 5,521,705 A | * | 5/1996 | Oldenbough et al. | 356/368 |
| 5,731,585 A | * | 3/1998 | Menders et al. | 250/382 |
| 5,912,748 A | * | 6/1999 | Wu et al. | 359/117 |
| 5,999,299 A | * | 12/1999 | Chan et al. | 359/172 |

* cited by examiner

Primary Examiner—Leslie Pascal
(74) Attorney, Agent, or Firm—Fish & Richardson P.C.

(57) ABSTRACT

A liquid crystal variable retarder (LCVR) with automatic gain control for use with an imager-based target tracking application such as a free-space laser communication system. An LCVR is made of two optical windows separated by a gap, typically of a few microns. The gap is filled with nematic liquid crystal material. Electrodes are situated to enable an electric field to be applied between the optical windows and thus across the liquid crystal material. With no voltage applied to the electrodes the liquid crystals lie parallel to the optical windows. In this state of operation, the LCVR exhibits maximum retardation. As voltage is applied to the electrodes the liquid crystal molecules rotate away from the optical windows, becoming perpendicular to the optical windows. In this state of operation, the LCVR exhibits minimum retardation. A preferred embodiment of the invention includes an optical train having a first polarizer, a filter, a second polarizer orthogonal to the first polarizer, a liquid crystal variable retarder, and a third polarizer orthogonal to the second polarizer. The light then passes through focusing optics that image the light onto an imaging array, such as a CCD device, or a photodetector. A feedback circuit controls the liquid crystal variable retarder to provide variable attenuation of an incoming light beam.

7 Claims, 2 Drawing Sheets

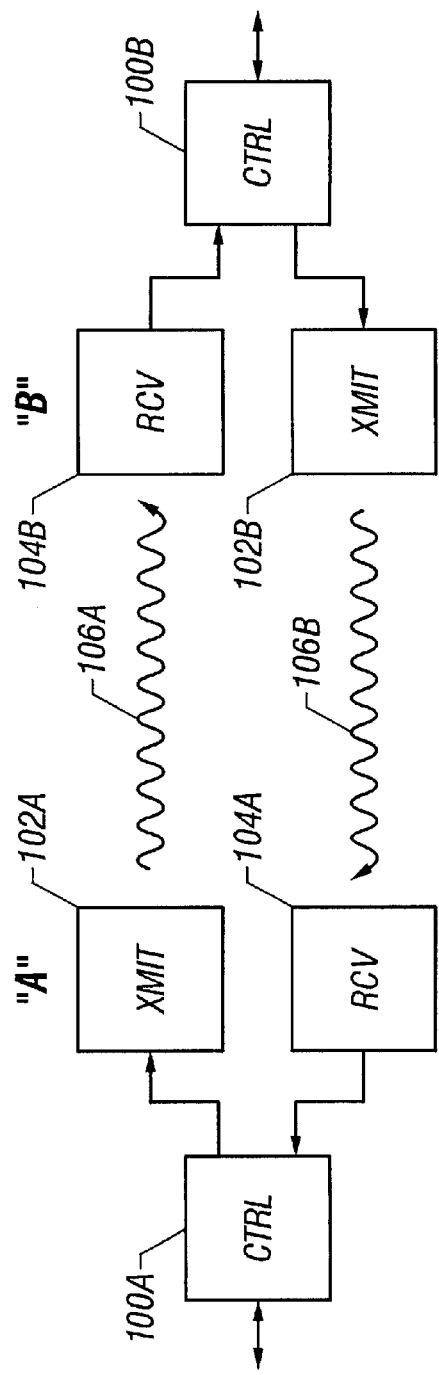
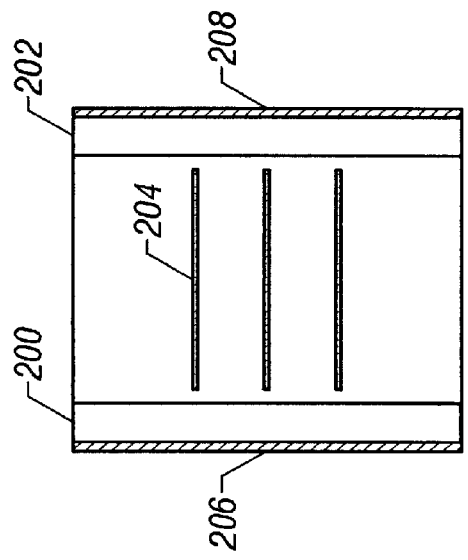
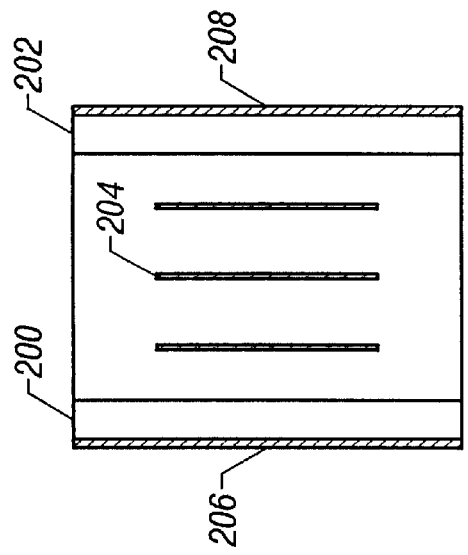

LIQUID CRYSTAL VARIABLE RETARDER FOR FREE-SPACE LASER COMMUNICATION SYSTEM

BACKGROUND

1. Technical Field

This invention relates to free-space laser communication systems, and more particularly to a method and apparatus for controlling the dynamic range of a received laser beam in a free-space laser communications system.

2. Background Information

Free-space laser communication systems transmit and receive information by means of a light beam that propagates through space or the atmosphere. When used for air-to-air or air-to-ground communications, such systems pose a number of challenging problems.

One such problem is high variability in the laser beam signal level. Air-to-air tracking applications using laser "beacons" may involve enormous changes in signal level. Typically, tracking an optical beacon of constant output over ranges from a few kilometers to hundreds of kilometers means detecting and processing signals whose level may change by four orders of magnitude or more. For example, tracking a 110 mW laser beacon from 5 km to 500 km means a signal that changes by a factor of 10,000. Thus, in engineering such systems, designers need to plan for about 80 dB of dynamic range.

Most "wide" field of view, high resolution laser communication tracking systems employ a charge coupled device (CCD) array. CCD's generally have excellent sensitivity and noise performance, can be clocked at high speed (for high bandwidth applications), and are easily integrated into tracking control loops. However, current CCD's do not have sufficient dynamic range to accommodate the great variability of signal levels in laser communication systems. Other imaging devices, such as photoconductor-on-CMOS devices, have similar problems.

Several approaches to solve this problem generally fall short of adequate solutions. For example, a variable iris for controlling the dynamic range of the incoming laser beam signal would need to be placed in the optical train at a point where it would not impact the system field of view. In addition, such an iris must be precisely aligned on the optical axis, since any asymmetric vignetting of the laser light would result in centroid (and thus pointing) errors. Lastly, an iris must be capable of providing at least 20 dB of attenuation from its position in the optical train. Ultimately the physical tolerances (on the order of a few microns), alignment difficulties and extinction requirements for a variable iris make this option undesirable.

As another example, neutral density (ND) filters or circular variable filters (CVF's) could be mechanically inserted in the optical train. ND filters would not impact the field of view, but optics inserted into the beam train would have to be carefully placed to prevent beam steering. Such beam steering would again result in significant centroid and pointing errors. CVF's could be placed in the beam train permanently, but variable thickness ("wedge") in the filter itself would cause beam steering as the filter was rotated.

As yet another example, liquid crystal shutters could be inserted in the optical train.

Although these devices suffer from none of the limitations of irises or filters, they are very limited in dynamic range, with extinction ratios typically of only about 4–5. This is far below the necessary extinction ratio of 100 or greater.

SUMMARY

The invention includes a liquid crystal variable retarder (LCVR) with automatic gain control for use with an imager-based target tracking application such as a free-space laser communication system. More particularly, the LCVR is part of a feedback system that adjusts the intensity of the incoming laser signal on a timescale appropriate to the tracking problem at hand. For an air-to-air free-space laser communication system, this signal compensation happens on the order of seconds to minutes.

A retarder (or waveplate) is an optical device that resolves a light wave into two orthogonal linear polarization components and produces a phase shift between the components. The resulting light wave is generally of a different polarization form. Ideally, retarders do not polarize, nor do they induce an intensity change in the light beam, but simply change the polarization form of the light beam. An LCVR is made of two optical windows separated by a gap, typically of a few microns. The gap is filled with nematic liquid crystal material. Electrodes are situated to enable an electric field to be applied between the optical windows and thus across the liquid crystal material. With no voltage applied to the electrodes the liquid crystals are co-aligned and lie parallel to the optical windows. In this state of operation, the LCVR exhibits maximum retardation. As voltage is applied to the electrodes, the co-aligned liquid crystal molecules rotate away from the optical windows, becoming perpendicular to the optical windows. In this state of operation, the LCVR exhibits minimum retardation.

A preferred embodiment of the invention includes an optical train having a first polarizer, a narrow-bandpass filter, a second polarizer orthogonal to the first polarizer, a liquid crystal variable retarder, and a third polarizer orthogonal to the second polarizer. The light then passes through focusing optics that image the light onto an imaging array, such as a CCD device, or a photodetector. A feedback circuit controls the liquid crystal variable retarder to provide variable attenuation of an incoming light beam.

An LCVR avoids the limitations of irises, neutral density filters, and LCD shutters. An LCVR can be placed permanently in the beam train of a receiver and effects of the LCVR on the incoming laser beam can be precisely calibrated. LCVR's contain no moving parts and thus will not contribute to any beam steering. The transmission of an LCVR in the band of interest typically can be better than 95%. The level of extinction of an LCVR depends on the quality of external polarizers, which can typically provide extinction ratios of 100 to 1000.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram showing a pair of free-space laser communication transceivers.

FIG. 2A is a diagram showing a liquid crystal variable retarder in accordance with the invention at maximum retardation.

FIG. 2B is a diagram showing a liquid crystal variable retarder in accordance with the invention at minimum retardation.

Like reference numbers and designations in the various drawings indicate like elements.

DETAILED DESCRIPTION

Figure 3:
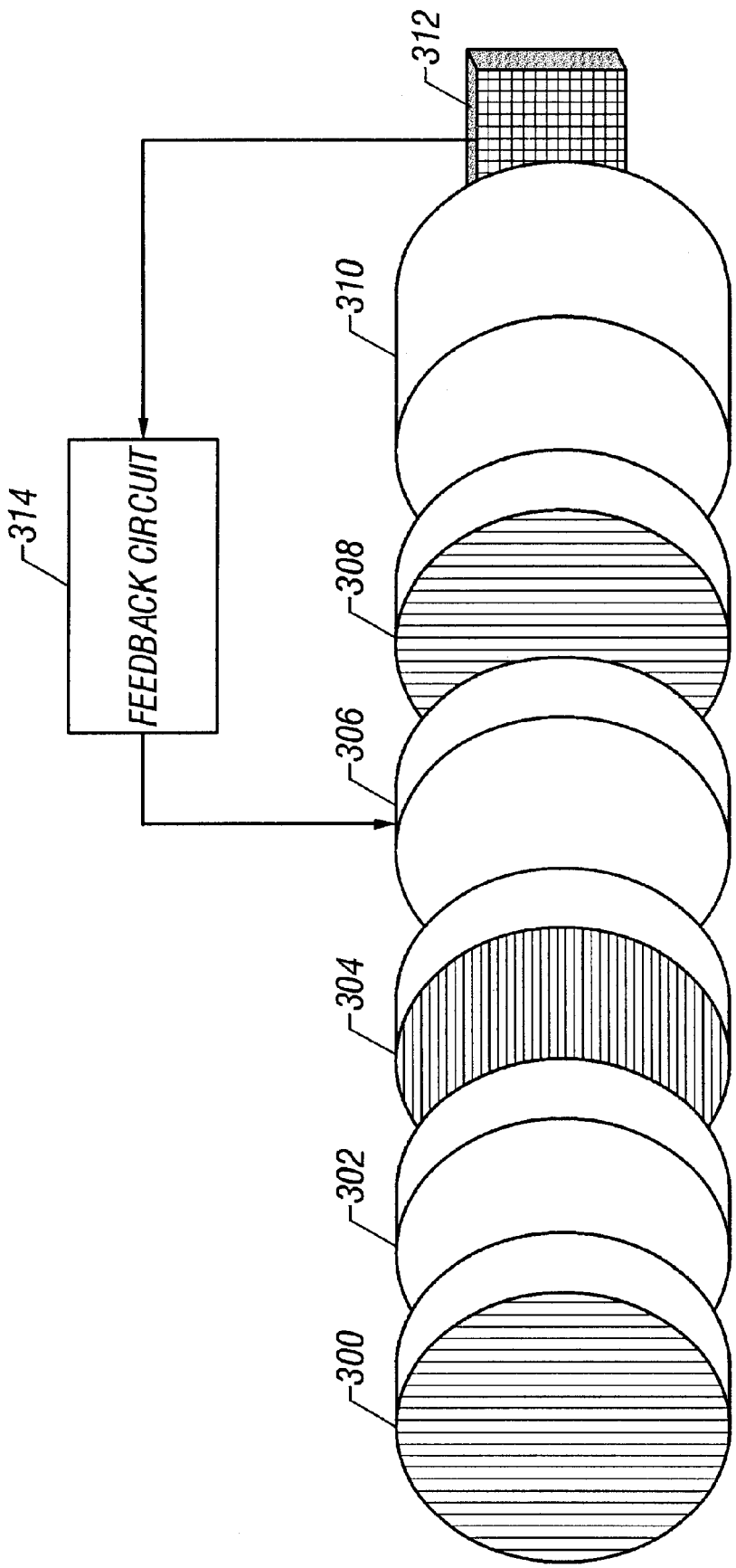
FIG. 3 is a stylized diagram showing the optical train of a free-space laser communication tracking receiver having a liquid crystal variable retarder in accordance with the invention.

The present invention will be described in the context of using CCD imaging devices in a free-space laser communication system. However, the principles of the invention apply to other imaging devices in a free-space laser communication system that exhibit limited dynamic range compared with the high variability of the laser beam signal level.

Photons illuminating a CCD generate photoelectrons that are collected in each pixel "well". The accumulated charge in each well can be sampled, and the sampled value related directly to the intensity of the light falling on that pixel. CCD pixels have a limited well capacity, which limits their dynamic range. A rule of thumb designers use is 800 electrons per square micron of pixel area.

Larger CCD pixels can be used to increase dynamic range, but doing so either adds tremendously to the physical size of a CCD array or decreases the resolution of the array. Neither outcome is desirable in a high resolution optical tracking system.

A typical system employed for acquisition and tracking in a free-space laser communication system may feature a CCD imaging array that is 256 pixels square, with each pixel perhaps 15–20 microns square. Each pixel in such an array may have a "well depth" of about 180,000 electrons, of which about 120,000 would be considered the usable, linear detection region of the CCD array. CCD's are not ideal devices, and in an array such as that described above, each pixel may possess a noise floor of about 150–200 electrons when clocked at a typical readout rate, such as 15 MHz.

For high resolution tracking, it is usually necessary to perform some kind of "subpixel" centroiding. That is, the location of a detected laser spot on the CCD array is determined to within some fraction of a pixel. Various studies have been done to determine the optimum signal-to-noise ratio (SNR) for differing levels of centroiding, but typically an SNR of approximately 10:1 is required to achieve ¼ pixel centroiding. For one embodiment of the invention, this SNR value requires a signal level sufficient to generate about 2,000 electrons in each illuminated pixel. If the linear "full well" capacity is about 120,000 electrons, then the CCD is limited to a 60:1 dynamic range, or about 18 dB, far below the expected 80 dB dynamic range of the incoming laser beam signal. The invention provides a solution to this problem.

FIG. 1 is a block diagram showing a pair of free-space laser communication transceivers. An "A" transceiver includes a control system 100A, a transmitter 102A, and a receiver 104A. A "B" transceiver includes a control system 100B, a transmitter 102B, and a receiver 104B. Transceiver A sends a data stream 106A from its transmitter 102A to the receiver 104B of transceiver B. Similarly, transceiver B sends a data stream 106B from its transmitter 102B to the receiver 104A of transceiver A. The implementation of the respective control systems 100A, 100B, transmitters 102A, 102B, and receivers 104A, 104B is conventional, except that the optical train of each receiver 104A, 104B has been modified in accordance with the present invention.

The invention includes use of a liquid crystal variable retarder (LCVR) within the optical train of each receiver 104A, 104B. A retarder is a device made from a material that has a different index of refraction on orthogonal axes, also known as birefringence. Accordingly, the components of incident light that lie along these two axes are propagated at different velocities, resulting in a phase shift. The velocities v are given by v=c/n, where c is the speed of light in vacuum and n is the index of refraction parallel to the direction of polarization. The practical result is that, with variable retardation, linearly polarized light can be rotated by varying degrees, through elliptical and circular and back to linear, orthogonal to the input direction. Ideally, retarders do not polarize, nor do they induce an intensity change in the light beam, but simply change the polarization form of the light beam.

FIGS. 2A and 2B show two states of operation of an LCVR in accordance with the invention. An LCVR is made of two optical windows 200, 202 separated by a gap, typically of a few microns. The gap is filled with nematic liquid crystal material 204. Nematic liquid crystals are birefringent materials whose effective birefringence can be changed by varying an applied voltage. Electrodes 206, 208 are situated to enable an electric field to be applied between the optical windows 200, 202 and thus across the liquid crystal material 204. A suitable LCVR may be obtained from Meadowlark Optics of Longmont, Colo.

With no voltage applied to the electrodes 206, 208, the liquid crystals are co-aligned and lie parallel to the optical windows 200, 202, as shown in FIG. 2A. In this state of operation, the LCVR exhibits maximum retardation. The long axis of the liquid crystals define the "extraordinary" or "slow" axis of the device. As voltage is applied to the electrodes 206, 208, the co-aligned liquid crystal molecules rotate away from the optical windows 200, 202, becoming perpendicular as shown in FIG. 2B. In this state of operation, the LCVR exhibits minimum retardation.

An LCVR differs from a conventional LCD shutter in that an LCD shutter relies on the fact that long liquid crystal molecules between crossed polarizers are randomly oriented in the "off" state. This "jumbled sea" of molecules generally blocks most light, but exhibits some leakage since some of the randomly oriented molecules will propagate light through the polarizers. Hence, the extinction ratio is low. When an electric field is applied, the molecules orient themselves so as to allow light to pass.

In an LCVR, the liquid crystal molecules are always co-aligned. Only the orientation of the molecules with respect to the polarizers changes as an electric field is applied. The LCVR itself does not polarize or change the intensity of a light beam, but simply changes the polarization form of the light beam.

FIG. 3 is a stylized diagram showing the optical train of a free-space laser communication tracking receiver having a liquid crystal variable retarder in accordance with the invention. A first polarizer 300, and a narrow-passband filter 302, and a second polarizer 304 orthogonal to the first polarizer 300 provide initial background light rejection. The filter 302 is preferably an atomic line filter (ALF) cell of the type shown in allowed U.S. patent application Ser. No. 07/935, 899, filed Aug. 27, 1992, entitled "Voigt Filter", and assigned to the assignee of the present invention, the teachings of which are incorporated by reference. Light passing thorough the filter 300 is rotated by 90° (or some multiple of 90°), which then passes through the orthogonal second polarizer 304. The output of the second polarizer 304 is filtered, linearly polarized laser light.

The linearly polarized laser light then passes through an LCVR 306. The LCVR 306, when in a fully "transmissive" state, provides sufficient retardation to rotate the incoming polarized laser light through 90°, thus allowing the light to pass through a third polarizer 308 optically orthogonal to the second polarizer 304. The combination of the LCVR 306 and third polarizer 308 act as a variable attenuator of the incident linearly polarized laser light.

The light then passes through focusing optics 310 that image the light onto an imaging array 312, such as a CCD device. The intensity of the received light on the imaging array 312 can be measured and an intensity output value can then be coupled to a feedback circuit 314. Alternatively, a non-imaging optical receiver device, such as a photodiode, can be used to measure the intensity of the received light and generate an intensity output value.

As the incoming signal intensity increases, the feedback circuit 314 changes the voltage applied to the LCVR 306 to decrease the retardation of the LCVR 306, decreasing the rotation of the incoming laser light's polarization. Accordingly, more light is blocked by the third polarizer 308. Eventually, at an applied voltage which provides no rotation of the incoming laser light, the laser light is completely blocked by the third polarizer 308. Thus, the extinction ratio of the optical train becomes that of the crossed polarizers. In practice, the extinction ratio achievable with crossed second and third polarizers and the LCVR is greater than about 100:1, and as much as 1000:1, more than adequate to achieve at least 40 dB of desired dynamic range in the receiver tracking system.

Conversely, as the incoming signal intensity decreases, the feedback circuit 314 changes the voltage applied to the LCVR 306 to increase the retardation of the LCVR 306, increasing the rotation of the incoming laser light's polarization. Accordingly, less light is blocked by the third polarizer 308.

In a preferred embodiment, the maximum pixel intensity on the imaging array 312 is averaged over some selectable interval, typically 114 10 seconds. This signal level is used in a conventional feedback circuit 314 to control the applied voltage to the LCVR 306. Calibration is by conventional means. This kind of low frequency feedback is more than adequate to compensate for the changes in incoming laser signal intensity caused by changes in range or atmospheric extinction. In this way, the LCVR 306 and feedback circuit 314 function as an automatic gain control for the tracking imaging array 312. Thus, by inserting the LCVR 306 into the optical train of a free-space laser receiver and adjusting the degree of retardation of the LCVR 306 to maintain the intensity of the received laser beam signal within a selected range, the received laser beam signal can be controlled to be within the dynamic range of the imaging array 312.

An LCVR avoids the limitations of irises, neutral density filters, and LCD shutters. An LCVR can be placed permanently in the beam train of a receiver and effects of the LCVR on the incoming laser beam can be precisely calibrated. LCVR's contain no moving parts and thus will not contribute to any beam steering. The transmission of an LCVR in the band of interest typically can be better than 95%. The level of extinction of an LCVR depends on the quality of external polarizers, which can typically provide extinction ratios of 100 to 1000.

A number of embodiments of the present invention have been described. Nevertheless, it will be understood that various modifications may be made without departing from the spirit and scope of the invention. Accordingly, other embodiments are within the scope of the following claims.

What is claimed is:

1. An apparatus for controlling the received signal level for a receiver in a free-space laser communication transceiver, comprising:

(a) a filtering and linearly polarizing assembly for receiving an incoming laser beam and producing filtered, linearly polarized light;

(b) a liquid crystal variable retarder, optically coupled to the filtering and linearly polarizing assembly and having a variable degree of retardation, for receiving the filtered, linearly polarized light and producing a variably retarded light output;

(c) a polarizer, optically coupled to the liquid crystal variable retarder and configured to be optically orthogonal to the direction of polarization of the filtered, linearly polarized light, for receiving the variably retarded light output and producing a variably attenuated received laser beam signal;

(d) an optical receiver, optically coupled to the polarizer, for receiving and measuring the intensity of the variably attenuated received laser beam signal and for generating an intensity output value;

(e) a feedback circuit, coupled to the optical receiver, for adjusting the degree of retardation of the liquid crystal variable retarder to automatically maintain the intensity of the variably attenuated received laser beam signal within a selected range in response to the intensity output value.

2. The apparatus of claim 1, wherein the filtering and linearly polarizing assembly comprises:

(a) a first polarizer;

(b) filter, optically coupled to the first polarizer;

(c) a second polarizer, optically coupled to the filter.

3. The apparatus of claim 2, wherein the filter comprises an atomic line filter.

4. The apparatus of claim 1, wherein the apparatus has a maximum extinction ratio greater than about 100:1.

5. A method for controlling the received signal level for a receiver in a free-space laser communication transceiver, comprising the steps of:

(a) filtering and linearly polarizing an incoming laser beam to produce filtered, linearly polarized light;

(b) passing the filtered, linearly polarized light through a liquid crystal variable retarder having a variable degree of retardation to produce a variably retarded light output;

(c) passing the variably retarded light output through a polarizer optically orthogonal to the direction of polarization of the filtered, linearly polarized light to produce a variably attenuated received laser beam signal;

(d) measuring the intensity of the variably attenuated received laser beam signal;

(e) automatically adjusting the degree of retardation of the liquid crystal variable retarder to maintain the intensity of the variably attenuated received laser beam signal within a selected range.

6. The method of claim 5, wherein the step of filtering and linearly polarizing an incoming laser beam comprises the steps of:

(a) passing the incoming laser beam through a first polarizer to produce linearly polarized light;

(b) passing the linearly polarized light through a filter to produce filtered light;

(c) passing the filtered light through a second polarizer, optically coupled to the filter.

7. The method of claim 6, wherein the filtering step comprises passing the linearly polarized light through an atomic line filter to produce filtered light.

* * * * *